Patented Apr. 9, 1935

1,997,366

UNITED STATES PATENT OFFICE 1,997,366

SIZED PAPER AND PROCESS OF MANUFACTURING THE SAME

Rudolf Kern, Oschatz, Germany, assignor to the firm Chemische Fabrik R. Baumheier Aktiengesellschaft, Zschollau, near Oschatz, Germany No Drawing. Application August 4, 1931, Serial No. 555,146. In Germany August 6, 1930

4 Claims. (Cl. 92—21)

My invention relates to improvements in sized paper, the process of manufacturing the same, and the emulsion used in the said process.

The processes heretofore in use for sizing paper by means of rosin or other sizing materials are objectionable for the reason that the amount of the size used in the process does not always result in the highest possible binding power, the reason being that the particles of rosin which are precipitated by aluminium sulfate are either too large or non-uniform.

When a size is used which is rich in free rosin the sizing process is difficult in practice, because the said size is not directly soluble in water, but it is necessary first to distribute the same under pressure by means of a steam jet.

Sizes which are rich in rosin soap, and which are more readily soluble in water, in time impart a yellowish tint to the sized paper, probably by reason of their alkalinity. The rosin sizes which are now used in the art are further objectionable because they are unstable as against hard or sour water. Therefore, it is frequently necessary, first, to free the return water from acid before returning the same to the paper machine, which operation is expensive and difficult. Another objection is that the excess of rosin causes foaming, and that a part of the fibre material is carried away by the overflowing foam and produces, in the return water, an emulsion with new rosin soap and, in some cases, with the lime soap being formed, which emulsion is similar to cream, which results in a loss of rosin and cellulose, which frequently is the cause of a reduction of the production, and which interferes with a smooth manufacture of the paper.

My invention is based on the discovery that the best sizing effect is obtained by using a rosin emulsion which can be readily solved (that is emulsified) in the cold, which is insensitive to acid and matter causing the hardening of the water, and which may be added to the Hollander after being previously prepared.

It has heretofore been proposed to disintegrate rosin in colloid mills for distributing the same in water. However, even this distribution is not sufficiently fine, and the rosin is precipitated after a comparatively short time. When the matter is allowed to stand for a long time the precipitated particles coagulate into lumps, and they cannot be emulsified again. Further, the particles of rosin are not sufficiently small, and it would be more proper to describe the liquid as a suspension rather than an emulsion.

I have found that the highest possible distribution and stabilization of the disperse phase is obtained by means of the homogenizing machine.

I have found that for the aforesaid purpose the emulsion is best suited which consists of rosin and a substance such as fatty oils, bile acid, wax, etc., which are adapted to lower the solidification point, and I may add a casein-soap-emulsifier, the mixture being homogenized in the homogenizing machine. In the said emulsions all the disperse particles are substantially equal in size, the size being less than 1/1000 mm, so that the surface of the fibre material of the paper is uniformly coated with small rosin drops. Further, it is not absolutely necessary to use the expensive aluminium sulfate as a precipitating medium, but the cheap sulphuric acid may be used. Another advantage of the emulsion is that it is perfectly neutral (pH—6,75) and that it is perfectly indifferent as against hard water and even against normal sulphuric acid. Therefore, no rosin soaps which would interfere with the production can be precipitated.

In the emulsion used for sizing I may also use mixtures of such substances together with rosin as the disperse phase, which are adapted to lower the melting point or the toughness of the rosin at elevated temperature, such as oils, alcohols, esters of any kind, waxes, etc. By using such a rosin emulsion for sizing, the manufacture of the paper is facilitated also in this respect that by reason of the said additions a better and lasting binding effect is obtained, because by unsuitable fritting temperature no harm is done, because the sizing matter is more plastic and fluent at elevated temperature.

Such an emulsion is less expensive than ordinary rosin size, because no soda is needed and saponification under pressure is dispensed with. No particles are precipitated from the emulsions, or at the most a very few particles which may be immediately emulsified again, particularly if the character and the volume of the said matter rendering the rosin plastic are such that the specific gravity of the disperse phase is equal to that of the dispersing medium. The rosin emulsion may be used as such or in combination with other sizing substances for sizing paper. Further, it may be used in mixture with dye-stuffs, filling matter or loading material. It has a high binding and covering power.

By my improved process paper may be sized by means of free rosin at low cost and in a satisfactory way.

*Example 1.*—700 parts of rosin are molten with 200 parts of an oil of turpentine of high boiling point, and stirred into a solution of 28 grammes of a casein soap emulsifying medium in 1000 parts of water. The casein soap emulsifying medium has been manufactured, for example, by adding 100 parts of casein to 80 parts of powdered rosin and slowly adding ammonia while heating and thoroughly kneading the matter until complete swelling and saponification is obtained, the matter being stirred to the highest degree of viscosity. The preliminary emulsion thus obtained from the rosin and the casein soap emulsifying medium is immediately homogenized at elevated temperature and under high pressure, by forcing the same through slots. Thereby a rosin emulsion is obtained. Fibre material has been mixed with 1,5% of this emulsion and precipitated with 0,3% of aluminium oxide in the form of a sulfate. In the same way the fabric has been sized, for the purpose of comparison, with an ordinary rosin size containing 10% of free rosin. In the flotation method the time of permeation for ink was 2½ minutes in case of sizing by my improved emulsion, while in case of sizing by means of ordinary rosin size the time was 5 seconds. Thus the said time of permeation was a multiple in case of sizing by means of the emulsion, as compared to the ordinary rosin size.

*Example 2.*—To a fibre material 49 parts of homogenized softened rosin were added in the Hollander. For the purpose of comparison, 130 parts of rosin and a few per cent of animal glue were added to a fibre material as rosin size. Thereafter the matter was precipitated respectively with 1½ and 2% of alum. The resistance to ink was good in both cases. It appears therefore that by using my improved emulsion 62,3% of material are spared.

*Example 3.*—By numerous tests the time of permeation for ink has been ascertained according to the floating method. The material was sized in the same way by means of ordinary rosin glue (I) and my improved rosin emulsion (II), both having the same degree of dryness. The solvents of the sizes were added in the usual way and with the usual concentration to the fibre material within the Hollander, and it was precipitated by means of aluminium sulfate. The time of permeation of I and II was at the ratio of 100 to 204.

I claim:
1. The process of sizing paper comprising sizing the paper with a homogenized rosin emulsion comprising rosin, a substance reducing the point of solidification of said rosin taken from a group consisting of fatty oils, oils of turpentine, alcohols of high boiling point and bile acids and an emulsifying medium, said emulsion having been homogenized by a homogenizing machine.

2. A paper which has been sized with a homogenized rosin emulsion and said emulsion comprising rosin, an emulsifying medium composed of rosin soap and casein soap and a substance for reducing the point of solidification of said rosin taken from a group consisting of fatty oils, oils of turpentine, alcohols of high boiling point and bile acids.

3. The process of sizing paper comprising sizing the paper with a homogenized rosin emulsion comprising rosin, a substance added to said rosin for reducing the point of solidification thereof taken from a group consisting of fatty oils, oils of turpentine, alcohols of high boiling point and bile acids and an emulsifying medium composed of resin soap and casein soap.

4. A paper which has been sized with a homogenized rosin emulsion and said emulsion comprising rosin, an emulsifier taken from a group consisting of alkali resin soap, alkali fatty acid soap, alkali caseinate and ammonium caseinate which will hold the dispersed portion in emulsion and a substance for reducing the point of solidification of said rosin taken from a group consisting of fatty oils, oils of turpentine, alcohols of high boiling point and bile acids.

RUDOLF KERN.